Patented Sept. 5, 1950

2,521,429

UNITED STATES PATENT OFFICE 2,521,429

THIOPHENE PRODUCTION FROM DIOLEFIN, HYDROGEN SULFIDE, AND ALUMINA

Edward F. Wadley, Baytown, Tex., assignor, by mesne assignments, to Standard Oil Development Company, Elizabeth, N. J., a corporation of Delaware No Drawing. Application April 14, 1947, Serial No. 741,432

3 Claims. (Cl. 260—329)

The present invention is directed to a method for producing thiophene. More particularly, the invention is concerned with a method for producing thiophene under catalytic conditions.

Thiophene has been found to be a very valuable chemical for altering the elasticity, brittleness, hardness, and other properties of plastics, for changing the coloring of dye stuffs, and imparting certain physiological effects to pharmaceuticals. Thiophene compounds and thiophene itself, therefore, are much in demand in view of their versatility in the uses mentioned above and in organic synthesis. Heretofore, the commercial availability of thiophene has been such that it has been more or less a rare chemical in view of the price that the cost of producing this material has made necessary.

It is an object of the present invention to provide a process for producing thiophene from butadiene.

Another object of the invention is to provide a method for reacting diolefins such as butadiene-1,3 to produce thiophene.

In accordance with the present invention, large quantities of thiophene are produced by reacting a diolefin such as butadiene-1,3 with hydrogen sulfide at a temperature in the range between 900° and 1100° F. in the presence of an oxide catalyst of a metal selected from group III of the periodic table. Under these temperature conditions in the presence of such a catalyst of the type illustrated, it is possible to produce high yields of thiophene with selective conversion.

Prior to the present invention, it has been customary to employ catalysts for the reaction between hydrogen sulfide and butadiene to produce thiophene. The catalysts employed by the prior art workers have usually included the iron type catalysts such as iron pyrites, the sulfides such as manganese or lead sulfides, and even aluminum sulfide. However, in the prior art work the yield of thiophene producible from butadiene and $H_2S$ has been low. Furthermore, besides thiophene being produced, appreciable quantities of the aromatic hydrocarbons such as benzene and toluene, carbon disulfide, and unidentified substances have been obtained. A product including thiophene and the aromatic hydrocarbons, carbon disulfide, and the unidentified material involves considerable expense in recovering thiophene therefrom. Therefore, if benzene and carbon disulfide are present, to say nothing of the unidentified material, it is necessary to subject the thiophene-containing product to expensive purification procedures to recover the desired product.

I have discovered that if an activated alumina catalyst is employed instead of the conventional sulfide type catalyst, higher yields of a fraction boiling in the thiophene range are obtained than heretofore with substantially selective conversion. A small quantity of benzene is produced in accordance with the present invention, but the segregated fraction of the product is over 90% pure thiophene.

Furthermore, it has been found that in the process of the present invention, appreciably lower temperatures will give better yields of higher purity product than when sulfide type catalysts are employed. Thus, for example, in the prior art processes, it has been conventional to employ temperatures in the range of about 930° to 1200° F. with the higher temperatures being favored. Contrary to these results, if an oxide of a metal selected from group III of the periodic table is employed as a catalyst, it is possible to obtain significantly higher yields of high purity product than was possible heretofore employing the lower temperatures in the range mentioned.

In the practice of the present invention, it will generally be preferable to employ aluminum oxide ($Al_2O_3$) as the catalyst. However, it will be understood that oxides of other metals selected from group III of the periodic table, such as boron, gallium, and indium, may be used if desired.

To exemplify the advantages of the present invention, runs were made in which a mixture of butadiene and hydrogen sulfide in equimolar mixture was passed over different catalysts at a temperature of 950° F. using a five second contact time with the feed mixture in contact with the catalyst at an atmospheric pressure. The product from each of the runs was passed through a condenser, cooled, and a liquid material including compounds boiling above about 25° C. was recovered. The liquefied product was distilled to segregate a fraction boiling between 115° and 195° F.

The data in the following table compare the results from the several runs mentioned:

| Catalyst Used | Iron Pyrites | $Al_2S_3$[1] $Al_2O_3$ | MnS | PbS | Activated $Al_2O_3$ |
|---|---|---|---|---|---|
| Product Analysis: | | | | | |
| Vol. per cent boiling between 115° and 195° F | 8 | 30 | 27.5 | 24 | 24 |
| Weight per cent Thiophene | | 16.6 | 18.1 | 17.5 | 25.1 |
| Analysis of 165° to 195° F. Fraction: | | | | | |
| Thiophene _____ weight per cent | About 70%[2] | 37.4 | 50.9 | 70.8 | 91.7 |
| Benzene _____ do | About 10 | 46.1 | 21.6 | 23.6 | 8.2 |
| Toluene _____ do | About 5 | 7.0 | 19.5 | 1.7 | 0.0 |
| $CS_2$ _____ do | About 1 | 1.9 | 0.4 | 1.4 | 0.1 |
| Unknown _____ do | | 7.6 | 7.6 | 2.5 | 0.0 |

[1] About 15% $Al_2S_3$.
[2] Insufficient amount produced for good analysis.

It will be apparent from the foregoing data that in the run employing activated alumina as the catalyst in accordance with the present invention, substantially larger amounts of thiophene were produced than in any of the other runs in which sulfide type catalysts were used. It will be further apparent that the purity of the thiophene fraction in the practice of the present invention was substantially higher than the thiophene fraction of any of the other runs. It is noteworthy that substantial amounts of benzene, toluene, carbon disulfide, and unidentified substances are present in the product resulting from the prior art processes. The product from the run in accordance with the present invention included thiophene and benzene with only a very small quantity of carbon disulfide.

Although atmospheric pressures may be employed with good results in the present invention, higher pressures may be used when necessary. Generally pressures in the range between about 15 to 150 pounds will be satisfactory.

The procedural steps employed will generally include the formation of a mixture of butadiene and hydrogen sulfide in optimum proportions and heating the mixture and then passing it over the aluminum oxide catalyst at a temperature in the range of 900° to 1100° F. The effluent from the reactor is cooled and condensed to recover products boiling above about 25° C. Products boiling above about 25° C. will generally be in a vaporous and/or gaseous state and may be recovered and processed as such. Uncondensible material will generally include the greater portion of the unreacted hydrogen sulfide and it may be desirable to scrub the uncondensed product with an alkaline solution to remove the hydrogen sulfide or to recover it. The uncondensed portion may be fractionally distilled to recover unreacted butadiene or it may be recycled to the reactor without further treatment to utilize the unreacted butadiene and hydrogen sulfide therein.

Although substantially pure butadiene-1,3 is preferred as the hydrocarbon portion of the feed stock, it is within the purview of this invention to employ mixtures of butadiene with butylenes. When it is desired to produce the higher homologs of thiophene, the higher boiling diolefins such as isoprene and pentadiene and the like may be employed in lieu of butadiene. Similarly, mixtures of diolefins such as the conjugated and unconjugated diolefins may be employed as the feed stock.

The nature and objects of the present invention having been fully described and illustrated, what I wish to claim as new and useful and to secure by Letters Patent is:

1. A process for producing thiophene which includes the steps of forming a feed mixture consisting of substantially equimolar amounts of butadiene-1,3 and hydrogen sulfide, heating the mixture to a temperature in the range of 900° to 1100° F. and passing the heated mixture over a catalyst comprising activated aluminum oxide to form a product including thiophene and recovering thiophene from the product.

2. A process for producing a thiophene which includes the steps of forming a feed mixture consisting of conjugated diolefin and hydrogen sulfide, heating the mixture to a temperature in the range of 900° to 1100° F., passing the heated mixture over a catalyst comprising activated aluminum oxide to form a product including a thiophene, and recovering the thiophene from the product.

3. A process for producing thiophene which includes the steps of forming a feed mixture consisting of butadiene-1,3 and hydrogen sulfide, heating the mixture to a temperature in the range of 900° to 1100° F., passing the heated mixture over a catalyst comprising activated aluminum oxide to form a product including thiophene, and recovering thiophene from the product.

EDWARD F. WADLEY.

REFERENCES CITED

The following references are of record in the file of this patent:

UNITED STATES PATENTS

| Number | Name | Date |
|---|---|---|
| 2,126,817 | Rosen | Aug. 16, 1938 |
| 2,330,934 | Thacker | Oct. 5, 1943 |
| 2,370,513 | Amos | Feb. 27, 1945 |
| 2,389,215 | Singleton | Nov. 20, 1945 |
| 2,418,374 | Stone | Apr. 1, 1947 |
| 2,428,727 | Thacker | Oct. 7, 1947 |